United States Patent [19]

Kluth et al.

[11] Patent Number: 5,570,437

[45] Date of Patent: Oct. 29, 1996

[54] APPARATUS FOR THE REMOTE MEASUREMENT OF PHYSICAL PARAMETERS

[75] Inventors: Erhard L. E. Kluth; Malcolm P. Varnham, both of Alresford, United Kingdom

[73] Assignee: Sensor Dynamics, Ltd., Itchen Abbas, United Kingdom

[21] Appl. No.: 340,023

[22] Filed: Nov. 14, 1994

[30] Foreign Application Priority Data

Nov. 26, 1993 [GB] United Kingdom ............... 9324334

[51] Int. Cl.$^6$ .................. G02B 6/00; G01L 1/24
[52] U.S. Cl. ................. 385/12; 385/15; 385/27; 385/88; 385/92; 385/100; 385/134; 385/147; 73/800
[58] Field of Search ................. 385/15, 16, 12, 385/27, 28, 88, 92, 100, 134, 101, 147; 73/763, 800, 774, 866.10

[56] References Cited

U.S. PATENT DOCUMENTS

| | | | |
|---|---|---|---|
| 3,817,328 | 6/1974 | Neuman .................. | 166/250 |
| 4,375,239 | 3/1983 | Barrington et al. ......... | 166/336 |
| 4,389,645 | 6/1983 | Wharton .................. | 385/100 X |
| 4,778,248 | 10/1988 | Arzur et al. .............. | 385/100 |
| 4,782,695 | 11/1988 | Glotin et al. ............. | 73/155 |
| 5,329,811 | 7/1994 | Schultz et al. ............ | 73/155 |
| 5,361,313 | 11/1994 | O'Keefe .................. | 385/11 |

FOREIGN PATENT DOCUMENTS 947104   1/1964   United Kingdom ........... 166/250 X

*Primary Examiner*—Brian Healy
*Attorney, Agent, or Firm*—Iandiorio & Teska

[57] ABSTRACT

Apparatus for the remote measurement of physical parameters comprising sensing means (1) for sensing at least one physical parameter, instrumentation means (2) for interrogating the sensing means (1) and making a measurement, cable means (3) for communicating between the sensing means (1) and the instrumentation means (2), container means (4) for containing the sensing means (1) and the cable means (3) prior to installation of the sensing means (1), container holder means (5) for providing a support for the container means (4) at a convenient location, channel means (6) for providing a channel between the container means (4) and a measurement location where the channel is suitable for accepting the cable means (3) and the sensing means (1), and cable installation means (9) for installing the sensing means (1) and cable means (3) from inside the container means (4) into the channel means (6) and placing the sensing means (1) at the measurement location.

15 Claims, 13 Drawing Sheets

APPARATUS FOR THE REMOTE MEASUREMENT OF PHYSICAL PARAMETERS

The invention relates to apparatus for the remote measurement of physical parameters in which the advantages of optical fibre cables and optical fibre sensors are exploited for use within the oil industry, particularly for use with remote subsea satellite wells and oil refinery stacks, and such that the sensors may be recovered and or replaced.

BACKGROUND OF THE INVENTION

As oil and gas reserves have been consumed over the years, the extraction of the oil and gas has become increasingly more difficult under more demanding conditions. Accordingly, there is a need for the reserves to be more widely monitored to a higher quality than hitherto, and this is particularly so for oil and gas reserves which lie beneath the sea bed. Optical fibre sensors, together with optical fibre cables to link the sensor to the measurement instrumentation, are being developed for this purpose since they offer specific advantages, particularly in the ability to withstand extremes of high pressure and temperature. Furthermore, such optical fibre sensors may be of a structure and diameter similar to those of the optical fibre cable itself. There are specific advantages in being able to remove and replace a sensor for the purposes of calibration, repair, and enhancement, but this is notoriously difficult to do within the oil industry, particularly with subsea wells because of the harsh environmental conditions and the sometimes considerable distances of tens kilometers between the desired point of measurement at the bottom of a well and the point of use of the information at the production platform. In addition, the substantial demands made on the equipment involved in extracting oil and gas make it very difficult and expensive to solve measurement problems. Hence, it is very desirable for there to be apparatus which is capable of isolating the problems of measurement from all the other challenges of exploiting the oil or gas reserves, particularly if it is not necessary to install the measurement system at the same time as the other equipment.

The chemical industry has a requirement to monitor discharges from stacks such as chimneys and pipes. In a typical processing site, many stacks will exist over many acres of ground. Currently, this monitoring is achieved by installing ladders and platforms on the outside of stacks, installing expensive equipment on the platforms, and sending trained personnel up the ladders to the platforms to perform measurements on a regular basis. An altogether better approach would be to have an apparatus which is capable of isolating the problems of measurement from the challenge of getting people and equipment into the remote measurement location, particularly if it is not necessary to install the measurement system at the same time as the other equipment.

SUMMARY OF THE INVENTION

An aim of the present invention is to improve on known apparatus by simplifying the apparatus needed to install and retrieve an optical fibre sensor for the measurement of physical parameters, and a further aim is to do so with minimum disturbance to the other operations taking place during oil and gas production.

According to of the present invention, there is provided apparatus for the remote measurement of physical parameters, comprising sensing means for sensing one or more physical parameters, instrumentation means for interrogating the sensing means and making a measurement, cable means for communicating between the sensing means and the instrumentation means, container means for containing the sensing means and the cable means prior to installation of the sensing means, container holder means for providing a support for the container means at a convenient location, channel means for providing a channel between the container means and a measurement location where the channel is suitable for accepting the cable means and the sensing means, and cable installation means for installing the sensing means and cable means from inside the container means into the channel means and placing the sensing means at the measurement location, the cable installation means comprising means for propelling fluid along the channel means.

The apparatus may include power supply means for supplying power to the apparatus.

The apparatus may include container insertion means for inserting the container means into the container holder means so that the channel connection is made.

The apparatus may include a channel connector means for making a channel connection between the container means and the channel means.

The sensing means may be one or more optical fibre sensors. Preferably the sensing means may be of dimensions permitting the channel means to be a commonly available component. Also preferably, the optical fibre sensor may be of a structure and diameter comparable with those of the cable means.

The instrumentation means may be such that a measurement may be recorded at the time of occurrence for use at a later time. The instrumentation means also may be such that the measurement is transmitted to a receiver situated elsewhere using a non-contact method such as radio wave communication.

The cable means may be one or more optical fibre cables containing one or more optical fibre waveguides. Preferably, the optical fibre cable may be one commonly used within the telecommunications industry. Preferably the optical fibre cable may be wound into a cable dispensing means similar to those in use in fibre optic guided missiles and torpedoes.

The container means may be a single unit or may be a plurality of units, each for the purpose of deploying embodiments of the sensing means.

The container holder means may be such as to accommodate the container means as a single unit, or may be such as to accommodate a plurality of units for the purpose of deploying embodiments of the sensing means.

The channel means may be one or more tubes with one or more cavities. Preferably, the channel means may be chemical injection or hydraulic tubing and, more preferably, the channel means may be commonly available quarter inch bore high pressure hydraulic tubing. The channel means may also be a natural cavity in the environment containing a guide such as a cable or a monorail or slotted rod. The channel means may also be used for calibrating the sensing means.

The cable installation means may be power assisted using hydraulic pressure and or hydraulic drag forces. The cable installation means may also be used for removing the sensing means from the channel means. The cable installation means may also include cable payout means for pulling cable means out of the container means in a controlled manner.

The power supply means may wholly reside within the container means. Alternatively, the power supply means may be located outside the container means, in which case there is further provided power connector means for making a power connection between the power supply means and the components of the apparatus inside the container means, where the power connection is made when the container means is located in the container holder means and the power connection is broken when the container means is removed from the container holder means. The power supply means may supply power in a combination of a variety of forms, such as electrical, magnetic, hydraulic, pneumatic and optical power.

The container insertion means may be manual for applications where the container holder means is situated at a benign location. For other and more extreme environments, the container insertion means may involve the use of automatic apparatus, such as subsea remote operated vehicles, for example when the container holder is situated on a sea bed.

In an embodiment of the present invention, the apparatus is one in which the cable installation means includes cable removal means for removing the sensing means and cable means from inside the channel means back into the container means, the channel connector means includes channel break means for breaking the connection between the container means and the channel means, and the container insertion means includes container removal means for removing the container means from the container holder so that the channel connection is broken.

In an embodiment of the present invention, the apparatus is one in which the instrumentation means is contained within the container means.

In another embodiment of the present invention, the apparatus is one in which the instrumentation means is situated outside the container means, and there is further provided communication means for connecting the cable means inside the container means to the instrumentation means. The communication means may include communication connector means for making a signal connection between the inside and the outside of the container means, where the signal connection is made when the container means is located in the container holder means and the signal connection is broken when the container means is removed from the container holder.

In another embodiment of the present invention, the apparatus is one in which the instrumentation means comprises an inside instrumentation means situated inside the container means and an outside instrumentation means situated outside the container means, and there is further provided instrumentation communication means for communicating between the inside instrumentation means and the outside instrumentation means. The instrumentation communication means may include instrumentation communication connector means for making an instrumentation connection between the inside instrumentation means and the outside instrumentation means of the container means, where the instrumentation connection is made when the container means is located in the container holder means and the instrumentation connection is broken when the container means is removed from the container holder.

The apparatus may be such that the communication connector means may be combined with power supply connector means.

BRIEF DESCRIPTION OF THE DRAWINGS

Embodiments of the invention will now be described solely by way of example and with reference to the accompanying drawings in which.

DETAILED DESCRIPTION OF THE DRAWINGS

Figure 1:
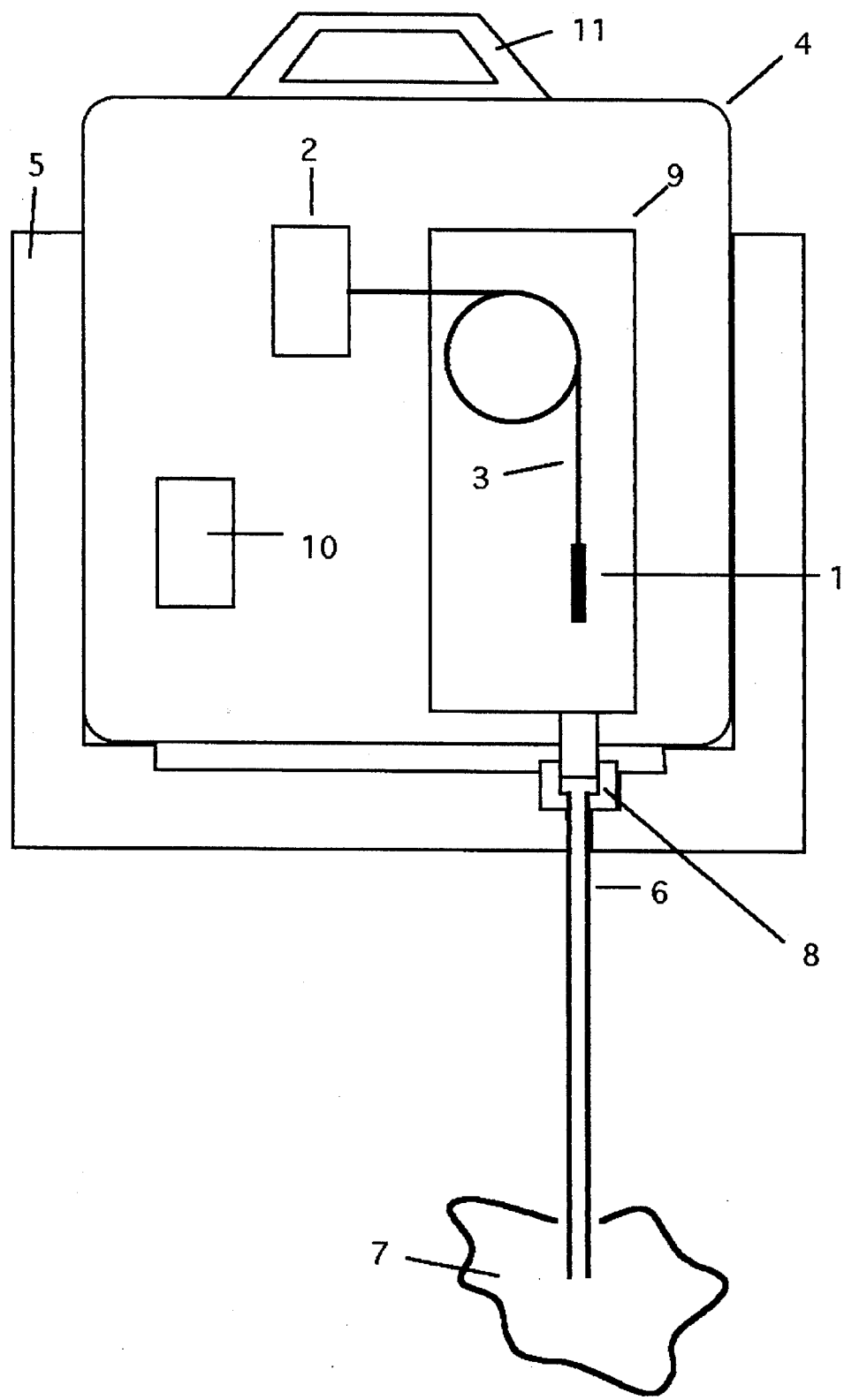
FIG. 1 is a diagram of an embodiment of the present invention in which the instrumentation means and power supply means are contained within the container means.

With reference to FIG. 1, a container means 4 contains sensing means 1, instrumentation means 2, cable means 3, cable installation means 9, and power supply means 10. The container means 4 is inserted with container insertion means 11 into container holder means 5 which is situated at some convenient location in relation to a measurement location 7 where a measurement is to be made. As the container means 4 is inserted into container holder means 5, channel connector means 8 makes a channel connection between channel means 6 and the container means 4. The channel means 6 provides a channel between the container holder means 5 and the measurement location 7 suitable for accommodating sensing means 1 and cable means 3. With container means 4 located in container holder means 5 such that the channel connection is made, cable installation means 9 may be operated so that sensing means 1 and cable means 3 are passed into channel means 6 until sensing means 1 reaches the measurement location 7. The apparatus may then be used to measure the desired parameter and either store the result in instrumentation means 2 for later use, or transmit the result to an external receiver (where there may be additional processing) using a form of non-contact communication.

Figure 2:
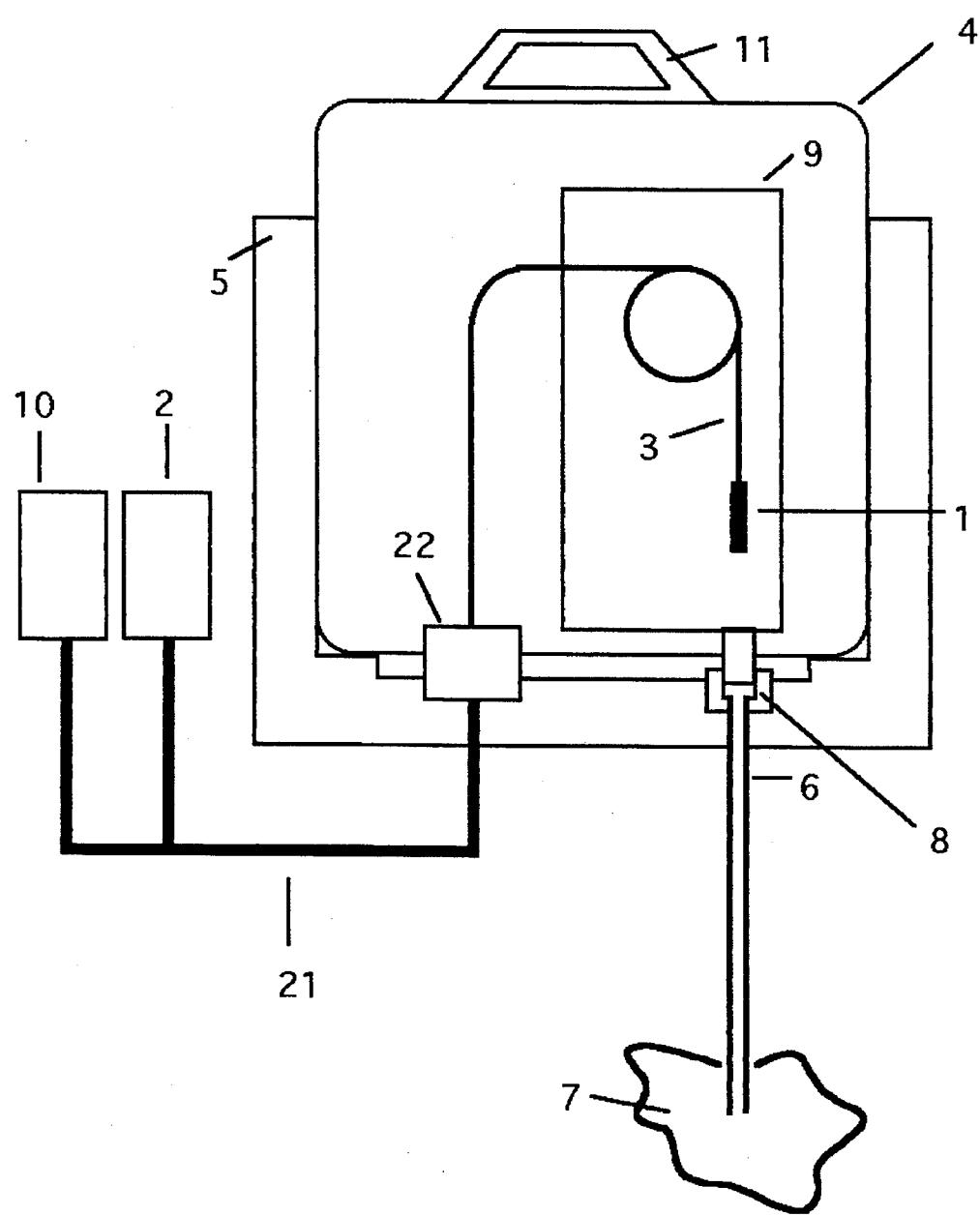
FIG. 2 is a diagram of an embodiment of the present invention, in which the power supply means and instrumentation means are external to the container means.

With reference to FIG. 2, the container means 4 contains the sensing means 1, the cable means 3, and the cable installation means 9. The container means 4 is inserted using the container insertion means 11 into the container holder means 5 which is situated at some convenient location in relation to the measurement location 7. As the container means 4 is inserted into container holder means 5, the channel connector means 8 makes the channel connection between the channel means 6 and the container means 4. A communications connector means 22 makes a connection between communication means 21 and the container means 4 where the communications means 21 links the communications connector means 22 to the instrumentation means 2. The communication means 21 and communications connector means 22 also provide the power connection between the power supply means 10 and the container means 4. After the container means 4 has been inserted in the container holder 5 and the channel connection, and the communications connection, have been made, the sensing means 1 may be installed as described with reference to FIG. 1, and the apparatus may then be used to measure the desired parameter.

Figure 3:
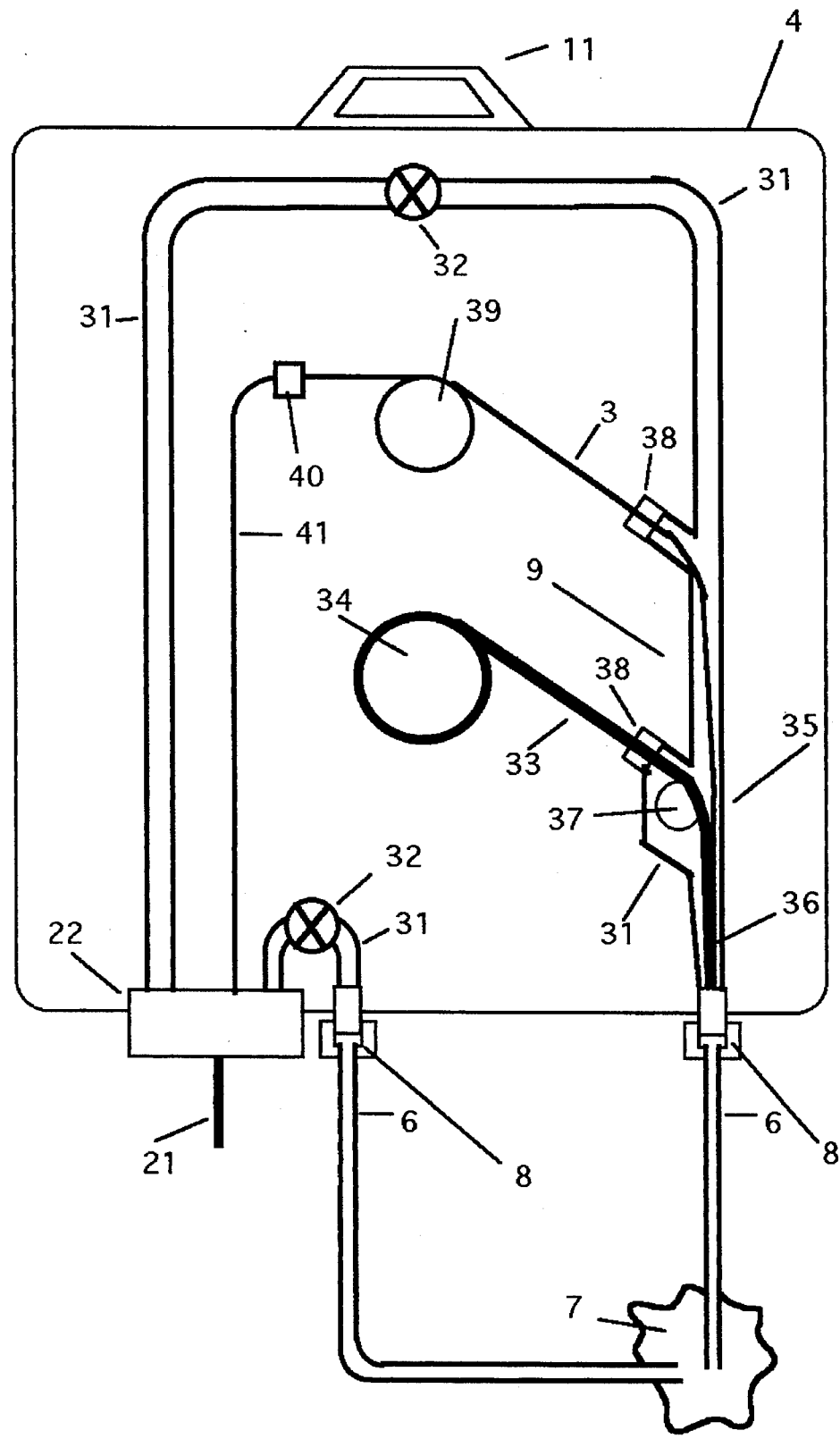
FIG. 3 is a diagram of an embodiment of the present invention in which details of the cable installation means are shown.

FIG. 3 shows an embodiment of the present invention which utilises hydraulic power which may be provided by the power supply means 10. The hydraulic power is communicated to the container means 4 via the communication means 21 and communications connector means 22. The hydraulic power is used for deploying and or retrieving the sensor means 1 and cable means 3.

The container means 4 contains container hydraulic channel means 31, which preferably may be convenient size hydraulic tubing, which connect to the channel means 6 via the channel connector means 8. The channel means 6 is preferably convenient size hydraulic tubing with a forward and return path to and from the measurement location 7. The channel connector means 8 is preferably hydraulic "stab" connectors which seal the hydraulic path when the connection is broken.

Valve means 32 are provided in the container to control the hydraulic flow. These are preferably hydraulic valves which may be controlled from signals communicated via the communication means 21.

The cable installation means 9 includes a strength member means 33, strength member supply means 34, and a cable combination means 35 which combines the strength member means 33 and the cable means 3 to make a combined cable means 36.

The strength member supply means 34 may be a drum of strength member means 33 wound onto a spooler, which may be a motorised system such that the cable can be spooled out under a controlled low tension, and/or spooled back under a controlled tension.

The strength member means 33 may be a cable with an internal cavity and a slit which opens up as it passes over a wheel 37. The cable means 3 may be fed into the internal cavity on the wheel 37 to form the combined cable means 36.

The strength member means 33 enters the container hydraulic channel means 31 via a sealing means 38 which may be a "stuffing box" i.e. the seal design allows the cable to be pulled through with minimum leakage.

The cable means 3 is wound onto a cable spooler means 39. One end of the cable means 3 is passed through a sealing means 38 to the cable combination means 35.

The other end of the cable means 3 is connected to a rotary connector means 40 which connects to the communications connector means 22 via a connecting cable means 41. The rotary connector means 40 allows the cable spooler means 39 to rotate (thus spooling the cable means in or out) without twisting the cable means 3 between the cable spooler means 39 and the connector means 22.

The strength member means 33 has a surface which offers impedance to fluid flow in hydraulic channels. This may be achieved with surface roughness, beads attached to the surface, or by adding beads or O-rings at the cable combination means 35. When hydraulic flow is activated around the hydraulic pathway comprising the hydraulic lines in the communication means 21, the container hydraulic channel means 31 and the channel means 6, this induces a force on the combined cable means 36 thus deploying the combined cable means 36 along the channel means 6.

Reversing the hydraulic flow either by suitable valves and hydraulic channels (not shown) in the container means 4 or by reversing the flow at or near the power supply means 10 (which may be on an oil or gas production platform) allows the sensing means to be recovered from the measurement location 7 into the container means 4. This recovery can be assisted by increasing the tension on the strength member supply means 34 such as to keep the combined cable means 36 in tension.

Additional hydraulic forces can be generated by designing the sensing means 1 such that it is housed in a package (not shown) which offers hydraulic impedance. The package (not shown) would have to be suitably designed such that it did not cause hydraulic instabilities during extraction.

Deployment can be similarly assisted by deploying the strength member means 33 around the channel means 6 and back to the container means 4 prior to combining the strength member means 33 and cable means 3. Mechanical apparatus(not shown) may then grip the strength member means 33 and apply tension.

The ability to retrieve the sensing means 1 allows calibration and servicing. The container means 4 may have design features which facilitate servicing—such as a lid (not shown) and a seal (not shown) as well as design features which facilitate calibration.

Figure 4:
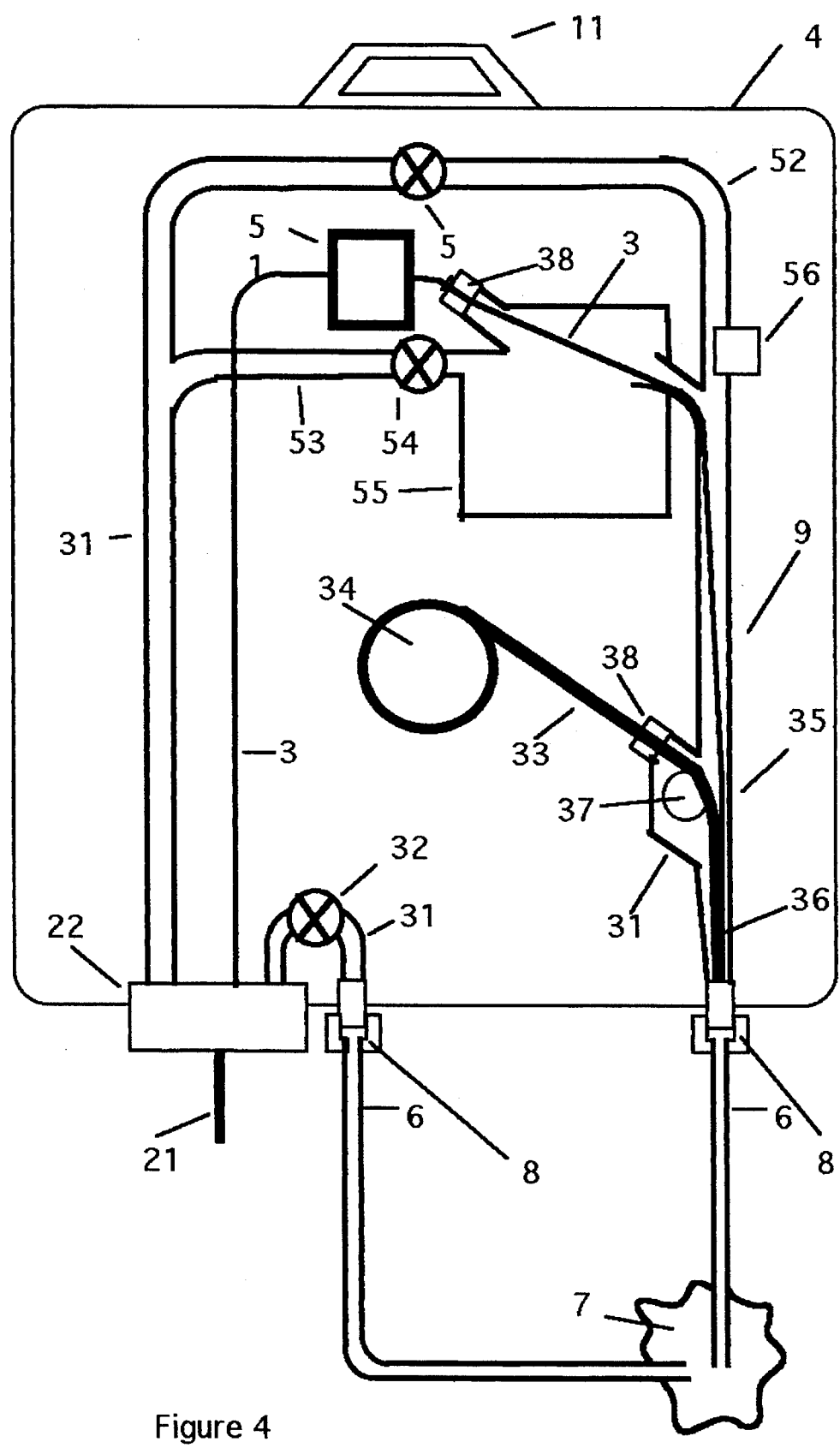
FIG. 4 is a diagram of an embodiment of the present invention with details of the cable installation means.

FIG. 4 shows an embodiment of the present invention where the cable means 3 is preloaded into the container means 4 in a cable winding support 51 where the winding method allows the cable means 3 to be pulled from the cable winding support 51 without twisting the cable means 3. The cable means 3 can thus be joined to the connector means 22 without using a rotary connector means 40 (FIG. 3).

The container hydraulic channel means 31 includes a deployment path 52 and an extraction path 53 together with controlling valves 54. Sensor deployment is achieved by passing fluid down the deployment path 52 and around the hydraulic circuit as before. Sensor extraction is achieved by reversing the hydraulic flow, closing the deployment path 52 and opening the extraction path 53. The extraction path 53 includes a receptacle 55 into which the cable means 3 will be stored.

Alternatively, the sensing means 1 may actuate a mechanical switch (not shown) to release tension on the strength member supply means 34 and to close the controlling valve on the extraction path 53. The sensing means 1 may be calibrated using a reference sensor 56.

Figure 5:
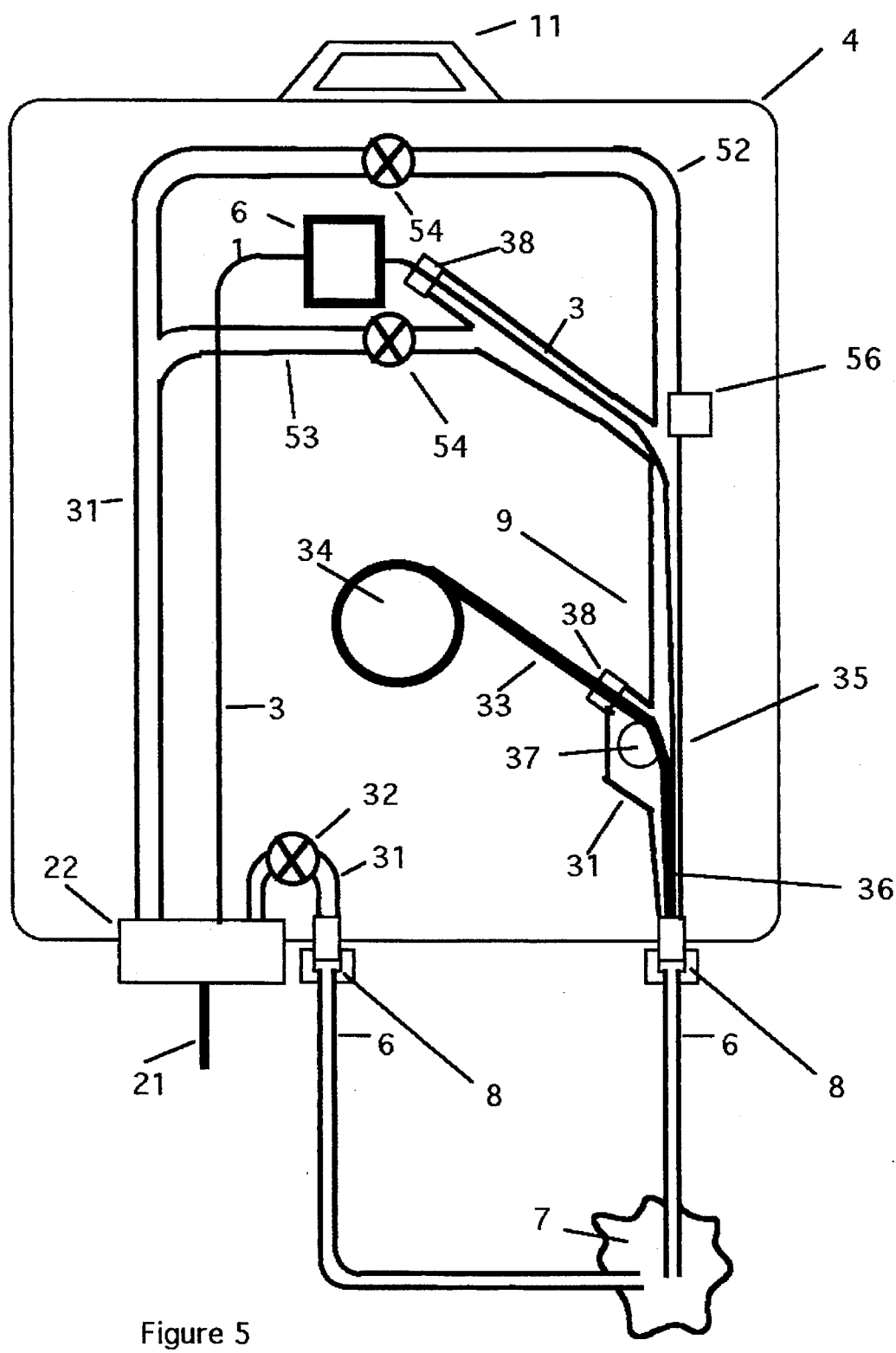
FIG. 5 is a diagram of an embodiment of the present invention with details of the cable installation means.

FIG. 5 shows an alternative method for repackaging the cable means 3 during retrieval. In this instance a winding machine 61 is provided which rewinds the cable means 3 without twisting the cable means 3. Such winding methods are commonly used in winding balls of string or wool.

Figure 6:
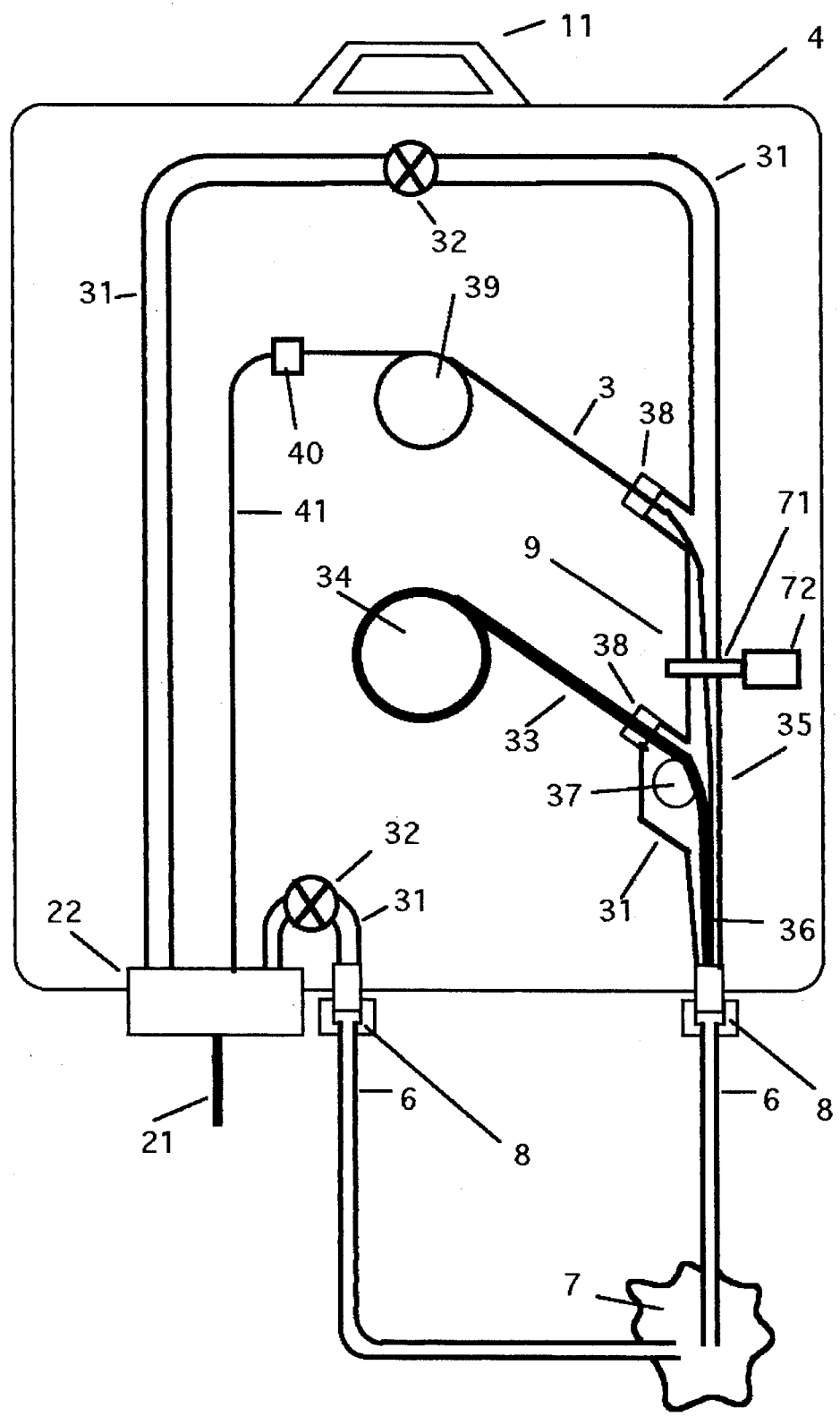
FIG. 6 is a diagram of an embodiment of the present invention with details of the cable installation means.

FIG. 6 shows an alternative method for repackaging the cable means 3 during retrieval. A cable severing means 71 powered by a solenoid 72 or other convenient actuating means severs the cable means 3 allowing the cable means 3 to be spooled onto the strength member supply means 34.

Figure 7:
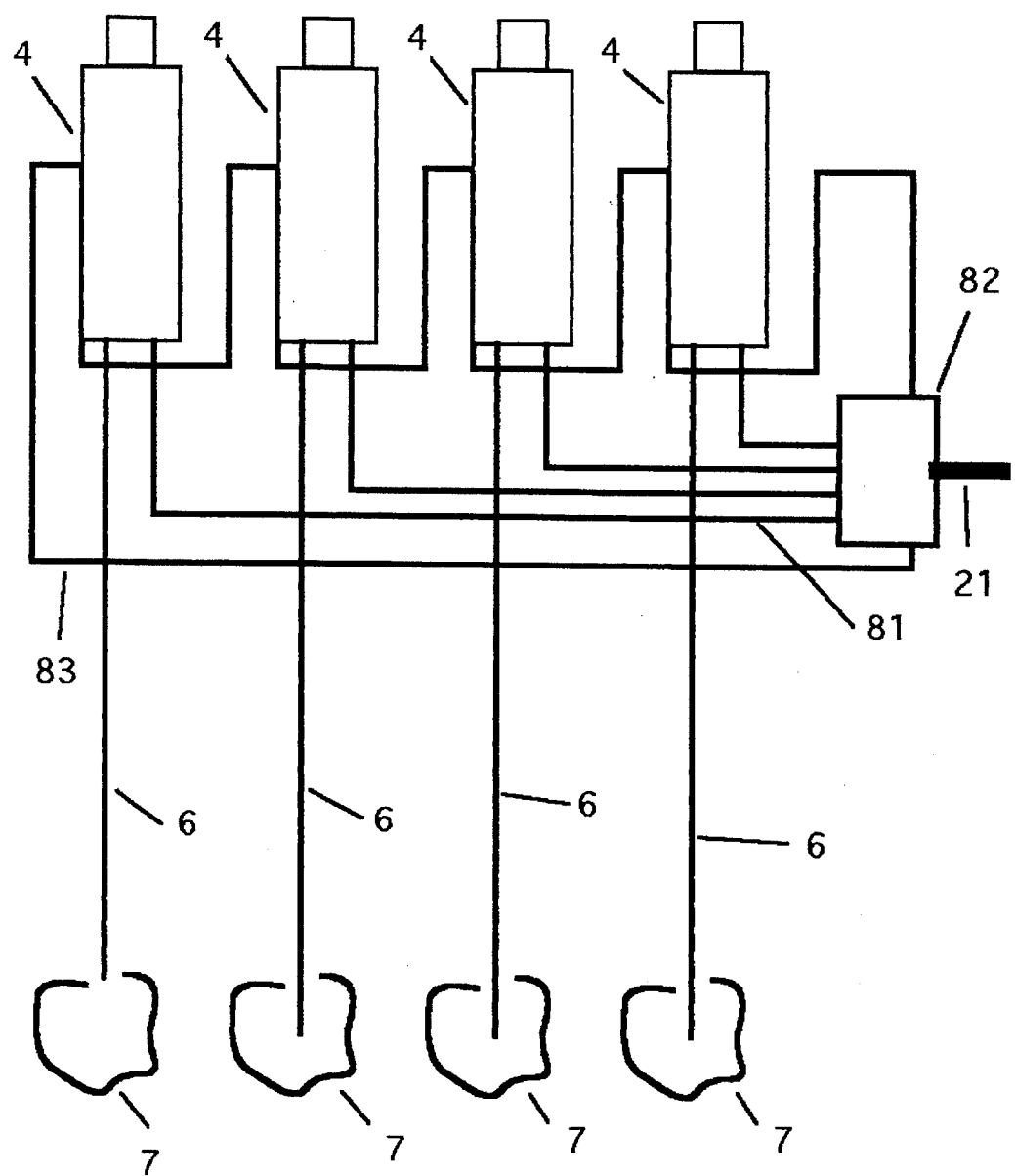
FIG. 7 is a diagram of an embodiment of the present invention where more than one container means are installed in a single container holder means.

FIG. 7 shows an embodiment of the present invention where the container holder means 83 is such that a plurality of separate independent container means 4 are loaded. These container means 4 may each be interconnected to the instrumentation means 2 via local communication cable means 81, a master connector means 82, and a single communication means 21. These cables and connectors providing the pathways for hydraulic power, electrical power, electrical signals, and optical signals. Each container means 4 may be individually connected to separate independent measurement locations 7 by separate independent channel means 6.

Figure 8:
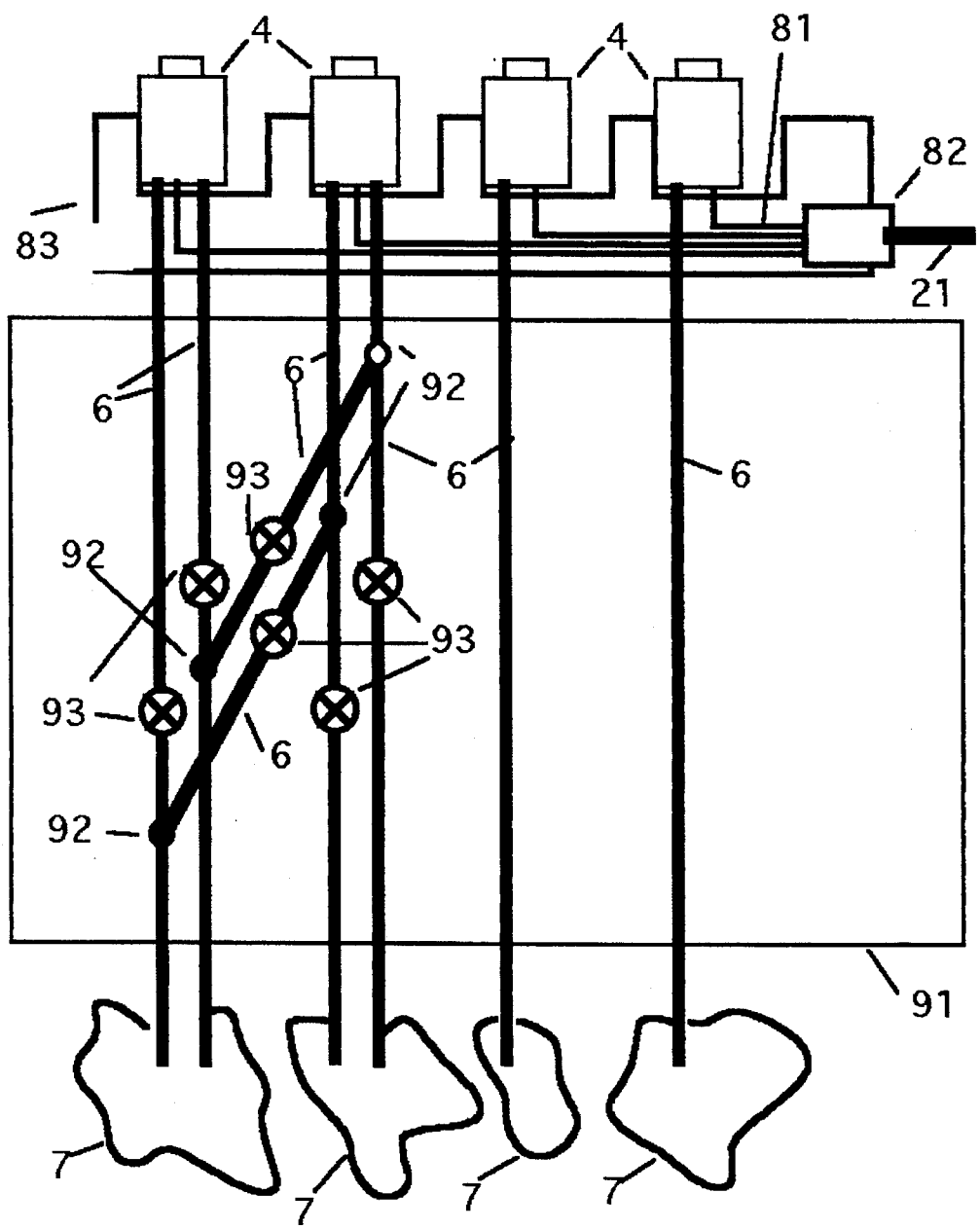
FIG. 8 is a diagram of an embodiment of the present invention where more than one container means are installed in a single container holder means.

Alternatively, the separate independent container means 4 may be addressably connected to more than one measurement location 7 using an addressable distribution means 91 as shown in FIG. 8. By way of example, one of the measurement locations 7 is connected to two container means 4 by channel means 6 which may comprise hydraulic lines. The hydraulic lines are connected with Y-junctions 92. Valves 93 are opened or closed in order to connect a closed-loop hydraulic path between the chosen container means 4 and the measurement locations 7 and back to the same container means 4 again.

Figure 9:
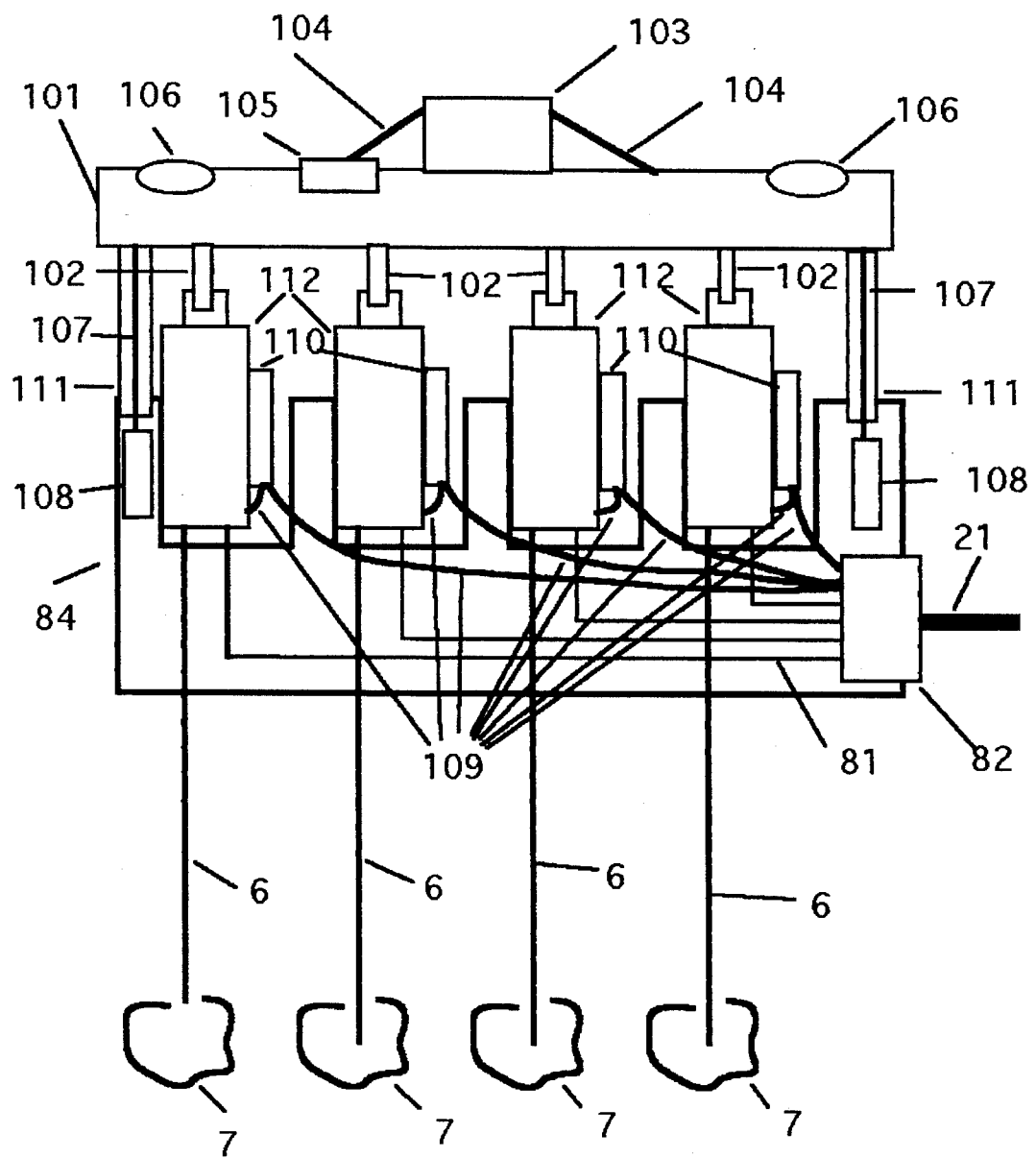
FIG. 9 is a diagram of an embodiment of the present invention where more than one container means are installed in a single container holder means.

FIG. 9 shows an embodiment of the present invention in which container holder means 84 holds a carrier 101 which can bring selected container means 112 to the surface of the sea by means of selection mechanism 102 for sensing means 1 replacement, servicing, and calibration.

A marker buoy 103 may be released (on command from signals supplied along the communication means 21) to the surface of the sea carrying marker buoy cables 104 with it which are attached to the carrier 101.

A support vessel (not shown) may retrieve the marker buoy 103 and send down a video pod (not shown) to the carrier 101 on one or more of the marker buoy cables 104 which may locate itself onto a marker buoy platform 105. The video pod (not shown) would inspect the installation and ensure that no cables were tangled and the installation is otherwise in order.

The sensing means 1 from selected measurement locations 7 is retrieved into the appropriate container means 112. The chosen container means 112 are engaged onto the carrier 101 by the selection mechanism 102 and the carrier 101 winched to the surface and hauled onto the ship using the marker buoy cables 104. The lifting of the carrier 101 may be assisted by floatation means 106 which may be floatation bags or the carrier 101 may be deliberately buoyant.

As the carrier 101 is winched to the surface, container holder cables 107 are paid out from container holder cable spoolers 108 on the container holder means 84. The container holder cable spoolers 108 may share a common drive.

A cable 109, containing optical fibre and power, may be connected between the cable means 3 to the master connector means 82 via a container spooler 110 attached to the outside of the container means 112.

Figure 10:
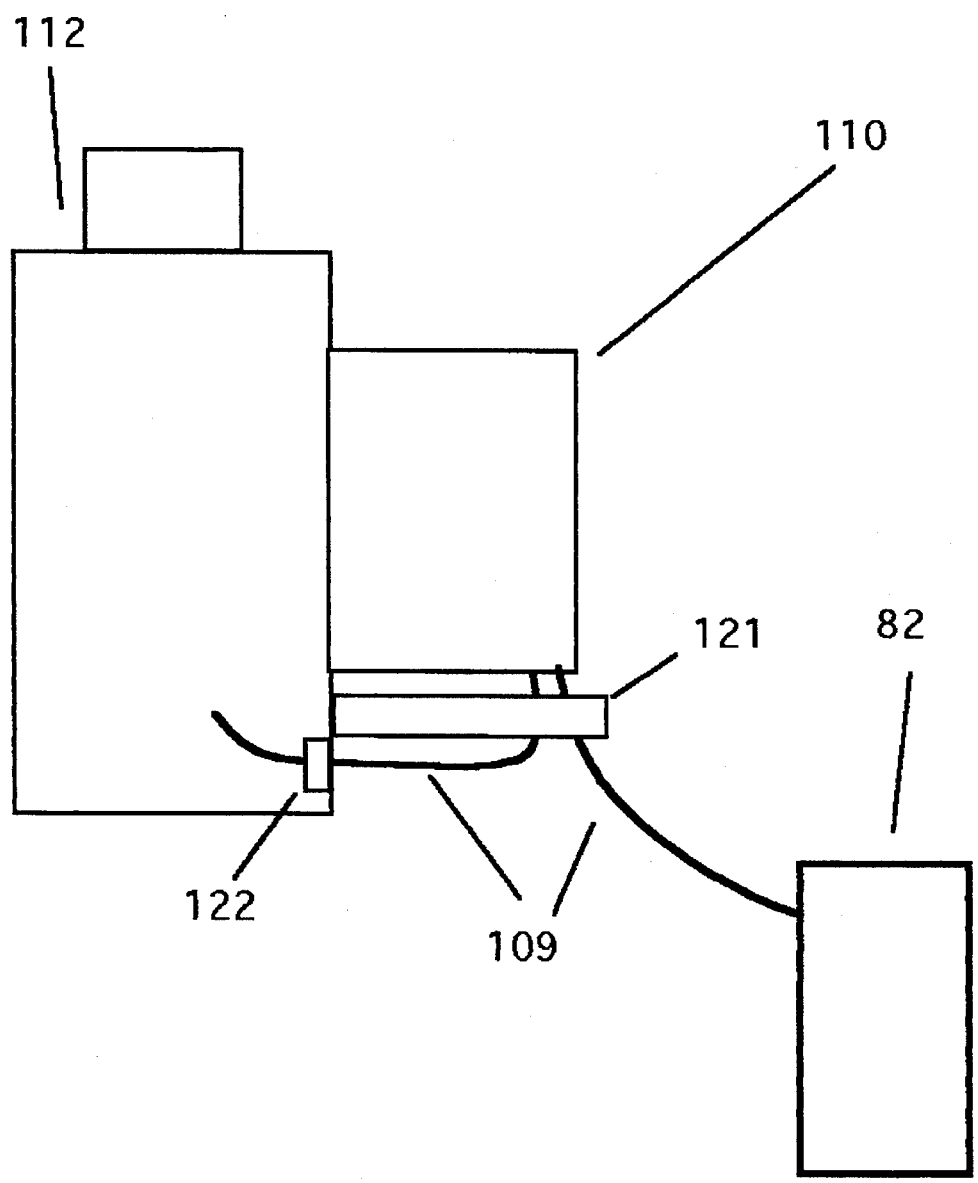
FIG. 10 is a diagram of an embodiment of the present invention detailing an aspect of the communication means.

With reference FIG. 10, both ends of the cable 109 may be wound onto the container spooler 110 such that when the container spooler 110 pays cable 109 out, both ends are paid out simultaneously. Similarly, when the container spooler 110 spools in, both ends of the cable 109 are wound simultaneously via the spooler guiding mechanism 121. The purpose of the spooler is to ensure that as the carrier 101 is lifted, the cable entering into the container means 112 does not twist. The container means 112 may therefore seal the entry of the cable at the container seal 122 and the cable 109 may be connected to the cable means 3 via appropriate joining methods such as fusion splicing, this joining being preferably carried out in the ship when the carrier is on board. This advantageously helps improve reliability.

With reference to FIG. 9, when servicing of the carrier 101 is finished, replacement of the sensing means 1 is finished, and calibration of the sensing means 1 is finished, the carrier 101 is lowered back to the container holder means 84. The motion of the carrier 101 is controlled by the container holder cable spoolers 108 and by control means (not shown) from the ship which may include ropes (not shown) connected between the ship and the carrier 101. Location of the carrier 101 may be achieved by carrier location means 111 which may include passing the container holder cables 107 through guides (not shown) for approximate location, and a mating conical connection (not shown) for fine location. Once the carrier 101 is located, channel connector means 8 and communication connect means 22 made, the sensing means 1 may be deployed.

Figure 11:
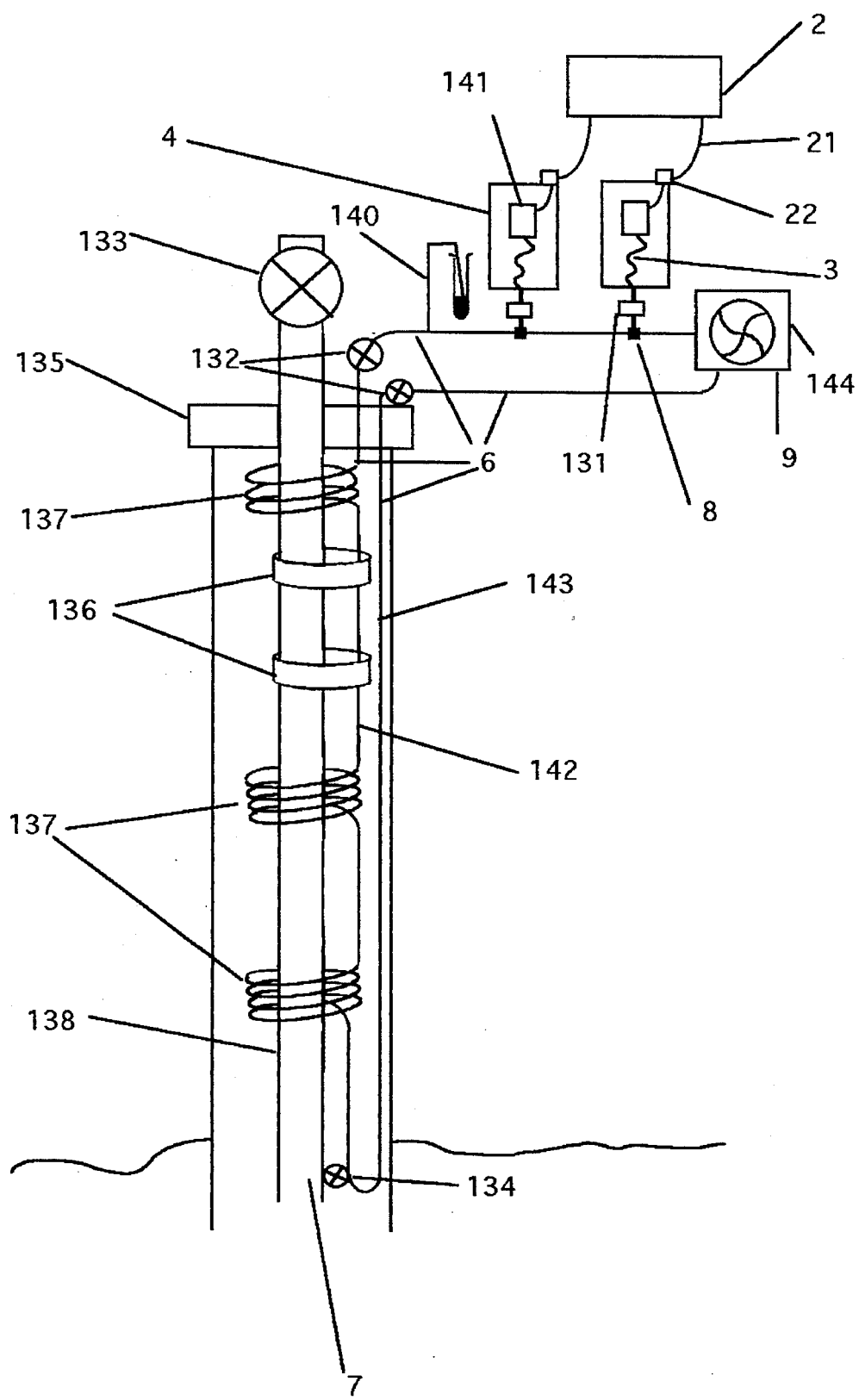
FIG. 11 is a diagram of an embodiment of the present invention detailing an oil or gas well.

FIG. 11 shows an embodiment of the present invention applicable for deploying sensors into an oil or gas well. The container means 4 may be a pressure vessel containing a cable dispensing means 141 from which the cable means 3 may be pulled out while the sensing means 1 is being deployed. The cable dispensing means 141 may be similar to high speed dispensers used in fibre or wire-guided missiles or torpedoes. The container means 4 may be held in place by the container holder means 5 (not shown), which may consist of a bracket or a location on the ground where the container means 4 is placed.

The information received at the measurement location 7 from the sensing means 1 (not shown) is communicated to the instrumentation means 2, where it will be analysed. It is communicated via the cable means 3, communication connector means 22 and the communication means 21. The cable means 3 may be optical fibre, the communication connector means 22 may be a high-pressure optical fibre connector, and the communication means 21 may be optical fibre.

At the exit to the container means 4 there may be a cable pay out means 131 which controls the rate at which the cable means 3 deploys. The cable pay out means 131 may comprise a high pressure bearing, through which there is a drive shaft. The drive shaft turns a wheel assembly which pulls the fibre out of the cable dispensing means 141. It should be noted that counting the revolutions of such a drive shaft would enable the length of cable dispensed to be measured.

The sensing means 1 attached to the cable means 3, deploys from the cable pay out means 131 into the channel means 6, where the drag forces resulting from fluid or gas from the cable installation means 9 transport the sensing means 1 and the cable means 3 along the channel means 6. The channel means 6 may comprise a downward channel means 142 and a return channel means 143. The cable installation means may be a hydraulic pump or may be a gas cylinder.

The apparatus may be designed to be compatible with chemical injection into the oil or gas well by providing a chemical injection port means 140. The chemical injection port means 140 may comprise a hydraulic connector which allows chemicals such as methanol or scale inhibitors to be pumped down the channel means 6 into the oil well.

The apparatus may include one or more safety valve means 132 which seal the channel means 6. The safety valve means 132 may be valves which can be hand operated to seal off the hydraulic channel.

The channel means 6 passes through the wellhead 135 into the oil or gas well. The channel means 6 is fastened to the production string 138 (through which oil and gas flows from the reservoir) by channel wrap means 136, which may be attached at intervals of 10 to 100 feet. The channel means 6 may be wrapped around the production string 138 in channel coil means 137. The channel coil means 137 may be regularly spaced at intervals of between 30–1000 feet, in order to prevent any excessive build up of tension due to drag forces in the cable means 3 whilst the cable means 3 is pumped into its measurement location 7. The return channel means 143 to the surface may either go straight along the production string 138 or may follow the same path as the downward channel means 142.

Pressure communication means 134 may be provided for pressure communication between the production string 138 and the channel means 6. This is essential for pressure sensors which are deployed into the channel means 6 by means of the current invention. The pressure communication means 134 may be a valve whose state can be switched between states such as open and closed. The pressure communication means 134 is not essential for measurement of temperature, acoustic energy, or electric current.

The channel means 6 may be used to calibrate pressure sensors since it provides a column of known liquid or gas which can be flushed through to remove contamination. The sensor pressure can thus be calibrated from a known reference pressure at a known location. A reference pressure may be obtained by opening the channel means 6 to atmospheric pressure at the surface or by using a calibrated reference pressure sensor.

Regardless of the sensor type or types, sensors may be retrieved from the channel means 6 by pumping fluid or gas through the channel means.

Figure 12:
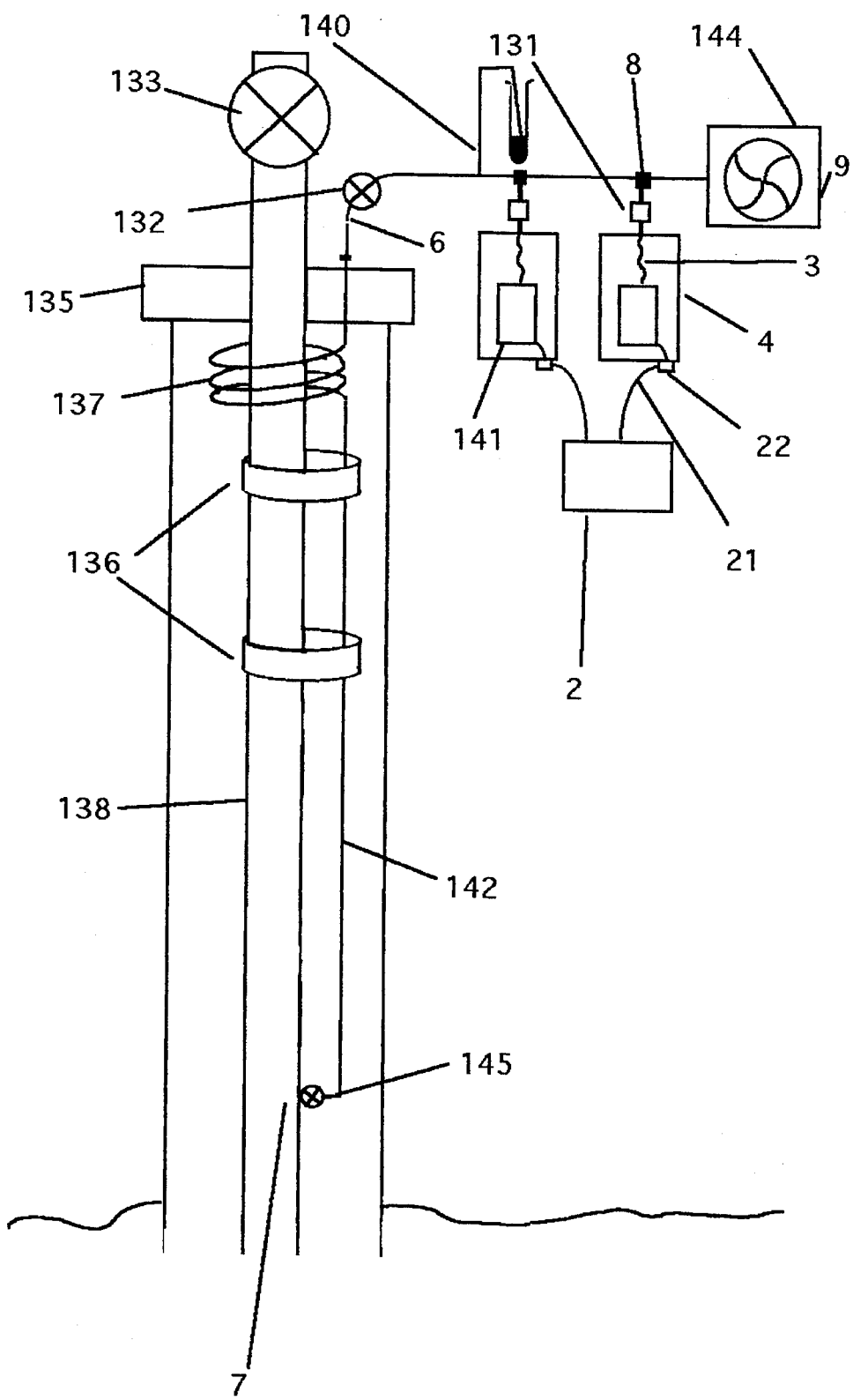
FIG. 12 is a diagram of an embodiment of the present invention detailing how the invention can be used to retrofit sensors into existing oil and gas wells.

FIG. 12 shows an embodiment of the present invention applicable for deploying sensors into an existing oil or gas well without having to extract the production string 138 from the oil or gas reservoir.

The embodiment takes advantage of existing channel means 6 which are often fitted to oil or gas wells for the purpose of chemical injection. In this case, the channel means 6 may comprise simply the downward channel means 142. There may also be only one channel coil means 137 wrapped around the production string 138 at the well head 135.

In this embodiment, the channel means 6 may end with a valve means 145 which can be replaced using techniques known in the oil and gas industry with the pressure communication means 134 described with reference to FIG. 11 if the sensing means 1 were a pressure sensor.

Figure 13:
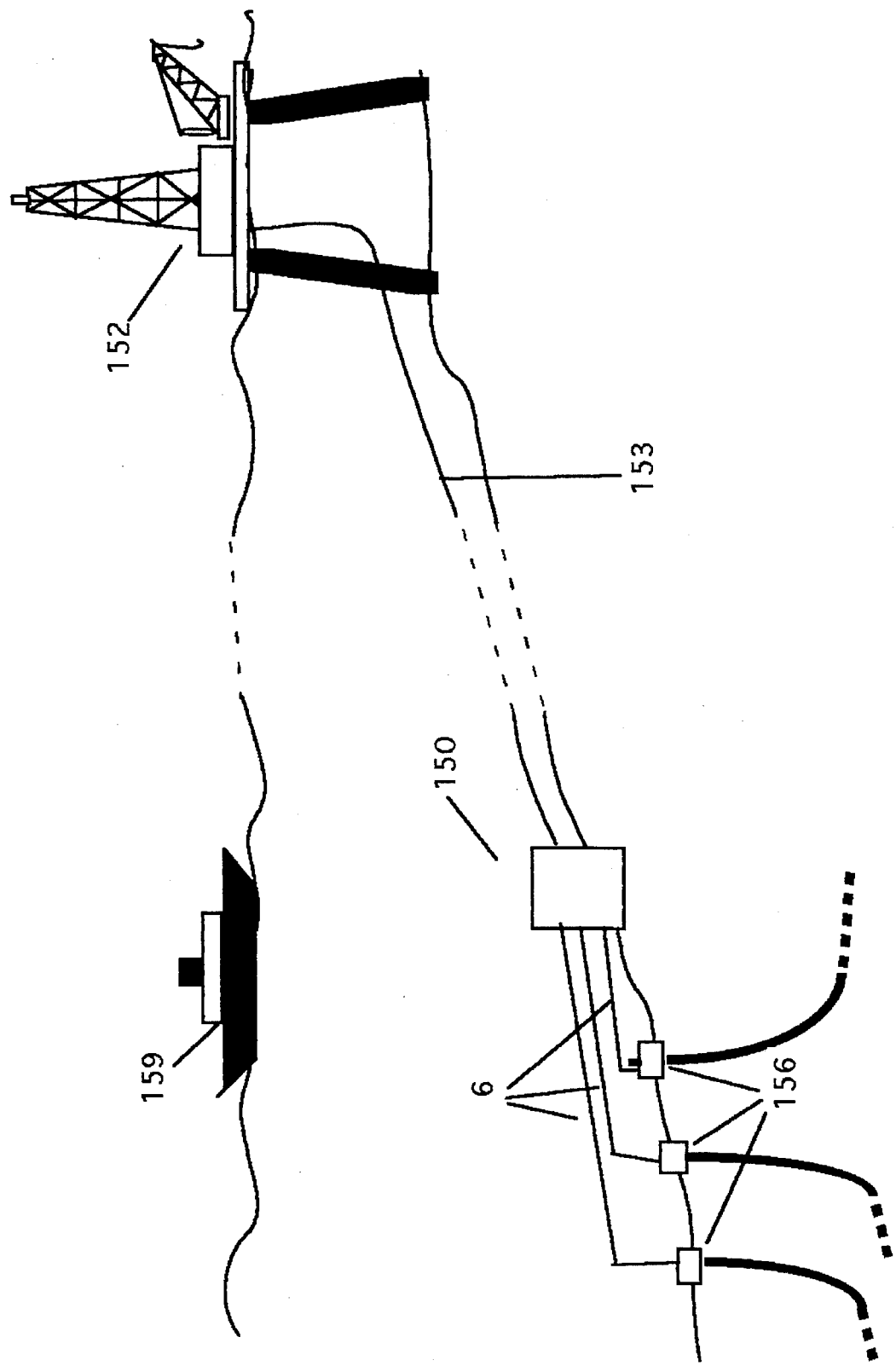
FIG. 13 is a diagram of an embodiment of the present invention detailing its application in deploying sensors into remote subsea oil and gas wells.

FIG. 13 shows how the embodiments of the invention described in FIGS. 7 to 10 and the embodiments described in FIGS. 11 and 12 apply in the oil and gas industry for deploying sensors into remote subsea oil and gas wells. FIG. 13 shows subsea wells 156 of the type shown in FIGS. 11 and 12 and a subsea control station 150 of the type referred to in FIGS. 7 to 10.

The distance between the subsea control station 150 and the platform 152 may be around 25 km and may become in excess of 100 km in the foreseeable future in fields in the gulf of Mexico and in the waters west of Shetland.

The container means 4 may be located into the subsea control station 150 by the method described in FIGS. 7 to 10, or by using a remotely operated vehicle ROV or by using a diver. This would be necessary for replacing and or upgrading the sensing means 1 (not shown).

Local hydraulic or pneumatic power may be supplied to the subsea control station 150 for the purposes of deploying sensing means 1 into the subsea well 156 from a service vessel 159.

The communication means 21 (not shown) from the sensing means 1 to the instrumentation means 2 may be accomplished by a variety of methods. For example, the instrumentation means 2 may be located on the platform 152 in which case the signals may be transmitted through the communication means 21 which may be an optical fibre situated within an umbilical control line 153. Connection between the cable means 3 in the container means and the communication means 21 may be by a wet mateable connector. Alternatively, if the instrumentation means 2 is located within the subsea control station 150, then communication to the surface may be by buoy, or by sending signals through the sea water as is common with submarine communication.

It is to be appreciated that the embodiments of the invention described above with reference to the accompanying drawings have been given by way of example only and that modifications and additional components may be provided to enhance the performance of the apparatus.

We claim:

1. Apparatus for the remote measurement of physical parameters, which apparatus comprises sensing means for sensing one or more physical parameters, instrumentation means for interrogating the sensing means and making a measurement, cable means for communicating between the sensing means and the instrumentation means, container means for containing the sensing means and the cable means prior to installation of the sensing means, container holder means for providing a support for the container means at a convenient location, channel means for providing a channel between the container means and a measurement location where the channel is suitable for accepting the cable means and the sensing means, and cable installation means for installing the sensing means and cable means from inside the container means into the channel means and placing the sensing means at the measurement location, the cable installation means comprising means for propelling fluid along the channel means.

2. Apparatus according to claim 1 and including container insertion means for inserting the container means into the container holder means so that the channel connection is made.

3. Apparatus according to claim 1 and including channel connector means for making a channel connection between the container means and the channel means.

4. Apparatus according to claim 1 in which the sensing means is at least one optical fibre.

5. Apparatus according to claim 1 in which the cable means is at least one optical fibre cable containing at least one optical fibre waveguide.

6. Apparatus according to claim 2 and including channel connector means for making a channel connection between the container means and the channel means, and in which the cable installation means includes cable removal means for removing the sensing means and cable means from inside the channel means back into the container means, the channel connector means includes channel break means for breaking the connection between the container means and the channel means, and the container insertion means includes container removal means for removing the container means from the container holder so that the channel connection is broken.

7. Apparatus according to claim 1 in which the instrument means is situation outside the container means, and there is further provided communication means for connecting the cable means inside the container means to the instrumentation means.

8. Apparatus according to claim 7 in which the communication means includes communication connector means for making a signal connection between the inside and the outside of the container means, where the signal connection is made when the container means is located in the container holder means and the signal connection is broken when the container means is removed from the container holder.

9. Apparatus according to claim 1 in which the instrumentation means comprises an inside instrumentation means situated inside the container means and an outside instrumentation means situated outside the container means, and there is further provided instrumentation communication means for communicating between the inside instrumentation means and the outside instrumentation means.

10. Apparatus according to claim 9 in which the instrumentation communication means includes instrumentation communication connector means for making an instrumentation connection between the inside instrumentation means and the outside instrumentation means of the container means, where the instrumentation connection is made when the container means is located in the container holder means and the instrumentation connection is broken when the container means is removed from the container holder.

11. Apparatus according to claim 1 in which the means for propelling fluid along the channel means is a hydraulic pump.

12. Apparatus according to claim 1 in which the means for propelling fluid along the channel means is a gas cylinder.

13. Apparatus for the remote measurement of physical parameters, which apparatus comprises sensing means for sensing one or more physical parameters, instrumentation means for interrogating the sensing means and making a measurement, cable means for communicating between the sensing means and the instrumentation means, container means for containing the sensing means and the cable means prior to installation of the sensing means, container holder means for providing a support for the container means at a convenient location, channel means for providing a channel between the container means and a measurement location where the channel is suitable for accepting the cable means and the sensing means, and cable installation means for installing the sensing means and cable means from inside the container means into the channel means and placing the sensing means at the measurement location, and in which the cable installation means includes strength member means for the cable means, the strength member means comprising a cable with an internal cavity and a longitudinal slit which is operable to allow the cable means to be received in the internal cavity.

14. Apparatus according to claim 1 and including cable pay out means for controlling the rate at which the cable means deploys.

15. Apparatus according to claim 14 in which the cable pay out means includes a wheel assembly

* * * * *